US006175233B1

United States Patent
McCurley et al.

(10) Patent No.: US 6,175,233 B1
(45) Date of Patent: Jan. 16, 2001

(54) TWO AXIS POSITION SENSOR USING SLOPED MAGNETS TO GENERATE A VARIABLE MAGNETIC FIELD AND HALL EFFECT SENSORS TO DETECT THE VARIABLE MAGNETIC FIELD

(75) Inventors: Jeffrey L. McCurley, White Pigeon, MI (US); James E. White, Warsaw, IN (US); Craig A. Jarrard, Middlebury, IN (US); Ronald C. Nonnenmacher; John Zdanys, Jr., both of Elkhart, IN (US); Thomas R. Olson, Chesterton, IN (US)

(73) Assignee: CTS Corporation, Elkhart, IN (US)

( * ) Notice: Under 35 U.S.C. 154(b), the term of this patent shall be extended for 0 days.

(21) Appl. No.: 08/999,585

(22) Filed: Feb. 2, 1998

Related U.S. Application Data

(63) Continuation of application No. PCT/US96/17255, filed on Oct. 18, 1996.

(51) Int. Cl.[7] .............................. G01B 7/14; G01B 7/30; H01L 43/06
(52) U.S. Cl. ................ 324/207.2; 324/207.23; 74/471 XY; 338/32 H
(58) Field of Search ................ 324/207.2, 207.21, 324/207.22, 207.23, 207.24; 338/32 R, 32 H; 74/471 XY

(56) References Cited

U.S. PATENT DOCUMENTS

| | | |
|---|---|---|
| 3,473,109 | 10/1969 | Maaz et al. . |
| 4,459,578 * | 7/1984 | Sava et al. ...................... 338/32 H |
| 4,639,667 * | 1/1987 | Andersen ...................... 324/207.23 |
| 4,703,261 | 10/1987 | Berchtold . |
| 4,928,089 | 5/1990 | Gasiunas et al. . |
| 4,958,615 | 9/1990 | Ohashi . |
| 5,365,791 | 11/1994 | Padula et al. . |
| 5,369,361 | 11/1994 | Wada . |
| 5,955,881 * | 9/1999 | White et al. ...................... 324/207.2 |

* cited by examiner

Primary Examiner—Walter E. Snow
(74) Attorney, Agent, or Firm—Mark P. Bourgeois; Mark W. Borgman

(57) ABSTRACT

A dual-axes position sensor 10 having an outer housing 12, an actuator 40, a linear Hall effect sensor assembly 20 for detecting position changes along a first (y) axis, and a linear Hall effect sensor assembly 30 for detecting position changes along a second (x) axis is disclosed. The housing 12 is preferably made out of a non-magnetic material such as plastic. Actuator 40 is rod shaped and coupled to a movable device or shaft (not shown) that is to have its position sensed. The linear Hall effect sensor assembly 20 is unattachably positioned to set on lip 52 of the housing 12, and includes a magnetically conducting pole piece 26, a magnet assembly 24 comprising an upper magnet 21 and a lower magnet 23 that are separated by an air gap 25. Magnet assembly 24 and pole piece 26 are positioned around a Hall sensor device support 14 in a "U" shaped configuration or form. Hall sensor device support 14 is fixedly attached to housing 12 via attachment area 54. Linear Hall effect sensor assembly 20 also includes a positionally fixed Hall effect sensor element 22 attached to Hall sensor device support 14 on surface 15. Linear Hall effect sensor assembly 30 is positioned approximately 90 degrees from and to linear Hall effect sensor assembly 20.

16 Claims, 4 Drawing Sheets

TWO AXIS POSITION SENSOR USING SLOPED MAGNETS TO GENERATE A VARIABLE MAGNETIC FIELD AND HALL EFFECT SENSORS TO DETECT THE VARIABLE MAGNETIC FIELD

This application is a continuation of PCT/US96/17255 titled, A two axes linear position sensor, filed Oct. 19, 1996.

BACKGROUND OF THE INVENTION

1. Technical Field

This invention relates to a Hall effect position sensor for determining linear position changes along two different axes. The sensor can be used for a variety of applications including a position sensor for a manual shifter.

2. Background Art

In recent years, many designers of positional sensing equipment have been designing a new breed of sensors based upon the general theories of magnetics. For example, the automotive industry has been in the process of converting the control system of the standard internal combustion engine to a system that can be controlled by a computer that receives input signals from mechanical and electrical systems using hall effect positional sensors.

Examples of patents related to the present invention are as follows, and each patent is herein incorporated by reference for supporting teachings:

U.S. Pat. No. 5,369,361 is a position detecting device using a hall sensor. The device comprises a Hall IC, a magnet, and a back yoke. The Hall IC is moved in a space above the magnet, the position can be detected based upon the change in flux density between the poles of the magnet.

U.S. Pat. No. 5,365,791,is a signal generator for generating an electrical signal that varies according to movement of an actuating member includes a plunger slidable mounted within a housing that carries a pair of permanent magnets for generating a magnetic field to be applied to a Hall effect generator.

U.S. Pat. No. 4,958,615,is a signal generator that has a Hall effect sensor and a magnet disposed inside a distributor housing.

U.S. Pat. No. 4,928,089, is an encoder for a wheel that uses a linear Hall effect sensor and magnet mounted on a non-ferrous metal shaft.

U.S. Pat. No. 4,703,261, is a measuring system for a gear measuring feeler that has a Hall effect sensor elements arranged in opposing relationship to each other in the magnetic field.

U.S. Pat. No. 3,473,109 is a position sensor utilizing a Hall generator. A pair of permanent magnets are co-planarly positioned with a pair of opposite poles abutting each other.

The foregoing patents reflect the state of the art of which the applicant is aware and are tendered with the view toward discharging applicant's acknowledged duty of candor in disclosing information that may be pertinent in the examination of this application. It is respectfully stipulated, however, that none of these patents teach or render obvious, singly or when considered in combination, applicant's claimed invention.

SUMMARY OF THE INVENTION

It is a feature of the invention to provide a Hall effect position sensor for determining linear position changes along two different axes.

An additional feature of the invention is to provide two Hall effect sensors. The first sensor detects any positional changes along the length of a first axis (y direction) of linear motion and a second sensor detects any positional changes along the length of a second axis (x direction) of linear motion.

The invention resides not in any one of these features per se, but rather in the particular combination of all of them herein disclosed and claimed, and it is distinguished from the prior art by this combination of structures for the functions specified.

There has thus been outlined, rather broadly, the more important features of the invention so the detailed description thereof that follows may be better understood, and so the present contribution to the art may be better appreciated. It is important, therefore, that the claims are regarded as including such equivalent constructions since they do not depart from the spirit and scope of the present invention.

The abstract is neither intended to define the invention of the application, which is measured by the claims, neither is it intended to be limiting as to the scope of the invention in any way.

Other features of the present invention will become more clear from the following detailed description of the invention, taken with the accompanying drawings and claims, or may be learned by the practice of the invention.

Figure 1:
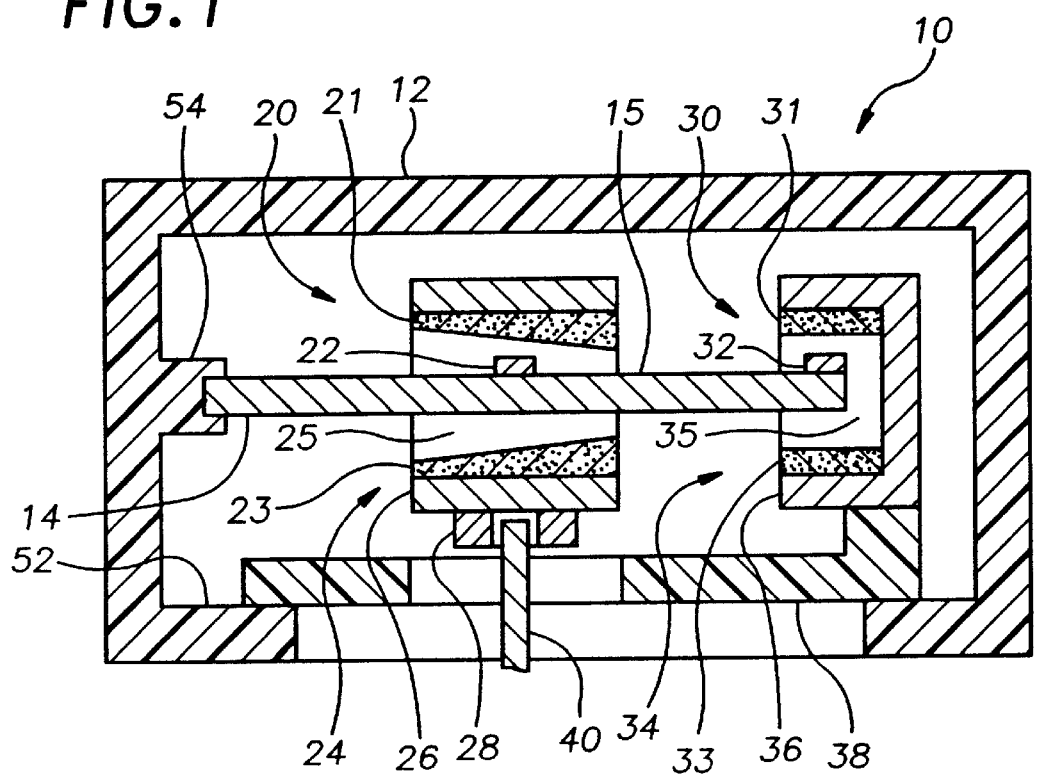
FIG. 1 is a cross sectional view of an embodiment of the invention taken along line a—a of FIG. 2.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail by the accompanying drawings. In the drawings, like numbering represents like elements between the drawings.

DISCLOSURE OF THE INVENTION

Figure 2:
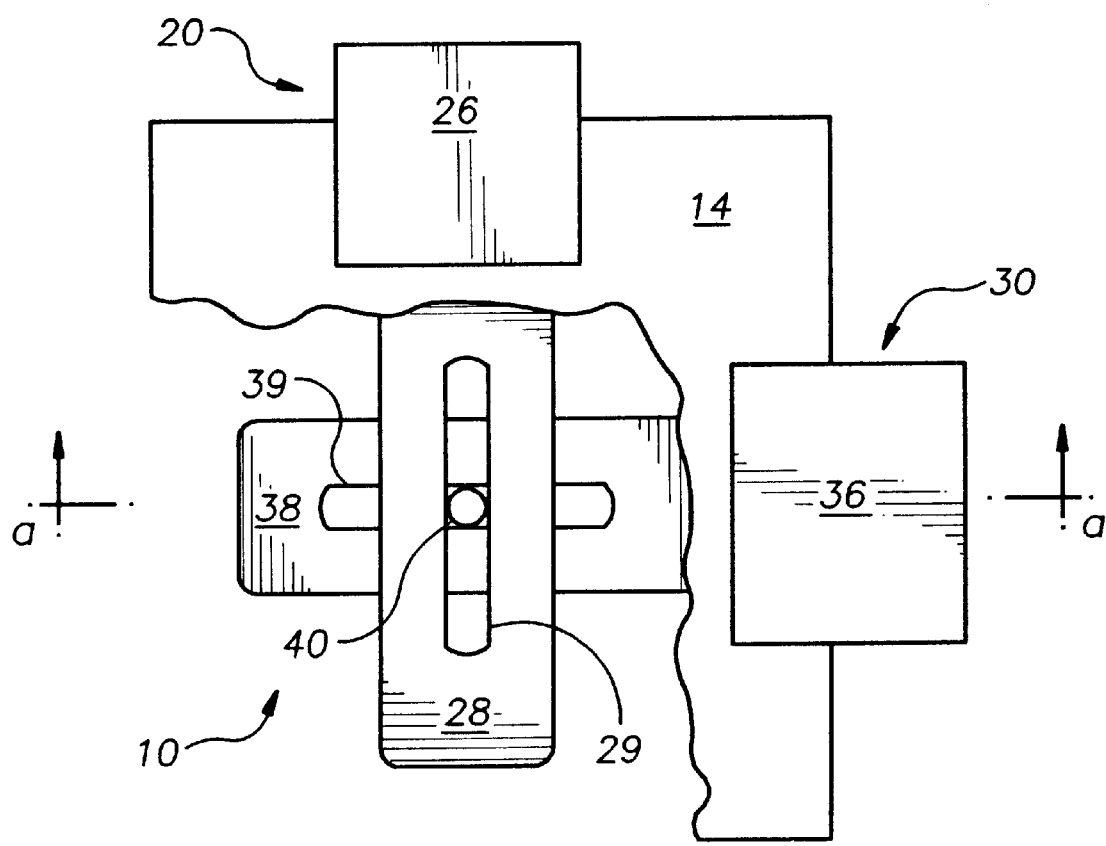
FIG. 2 is a sectional view of the embodiment of FIG. 1 with the housing removed.

The present invention provides a Hall effect position sensor for determining linear position changes along two different axes. Regarding FIG. 1 and FIG. 2, there is a dual axes position sensor 10 having an outer housing 12, an actuator 40, a linear Hall effect sensor assembly 20 for detecting position changes along a first (y) axis, and a linear Hall effect sensor assembly 30 for detecting position changes along a second (x) axis, The housing 12 is preferably made out of a non-magnetic material such as plastic. The actuator 40 is rod shaped and coupled to a movable device, body, or shaft (not shown) that is to have its position sensed.

The linear Hall effect sensor assembly 20 is unattachably positioned to set on lip 52 of housing 12, and includes a magnetically conducting pole piece 26, a magnet assembly 24 that comprises an upper magnet 21 and a lower magnet 23 that are separated by an air gap 25. Air gap 25 changes width along the length of pole piece 26 as the thickness of magnet assembly 24 varies. Magnet assembly 24 may be insert molded to pole piece 26 or molded separately and glued in place. Pole piece 26 is attached to a slide 28 which slidably sits on top of slide 38. Slide 28 has a longitudinal slot 29 capable of receiving actuator 40 (scotch-yoke configuration). Magnets assembly 24 and pole piece 26 are positioned around a Halt sensor device support 14 in a"U" shaped configuration or form. Hall sensor device support 14 is fixedly attached to housing 12 via attachment area 54. A positionally fixed Hall effect sensor element 22 attached to Hall device support 14 on surface 15.

Linear Hall effect sensor assembly 30, positioned approximately 90 degrees from linear Hall effect sensor assembly 20, likewise includes a magnetically conductive pole piece 36 and a magnet assembly 34 that comprises an upper magnet 31 and a lower magnet 33 that are separated by an air gap 35. Pole piece 36 is attached to a slide 38 which slidably sits on lip 52 of housing 12. Slide 38 has a longitudinal slot 39 capable of receiving actuator 40 (scotch-yoke configuration). Magnets assembly 34 and pole piece 26 are positioned around the Hall sensor device support 14 in a"U". shaped configuration or form. A positionally fixed Hall effect sensor element 32 attached to Hall device support 14 on surface 15.

In operation, the dual-axes position sensor 10 will sense linear positioning along two different axes (y and x) of a body (not shown) that is coupled to actuator 40. In particular, when the body is moved in a direction perpendicular to slide 28, linear Hall effect sensor assembly 20 will determine the exact position of the body along the y-axis. The position detection is accomplished by actuator 40 pushing slide 28 and correspondingly both magnet assembly 24 and pole piece 26 in the same direction. As magnet assembly 24 is moved, the magnet thickness and magnetic flux density ($B_x$) surrounding Hall effect sensor element 22 varies and is detected. Hall effect sensor element 22 produces a voltage signal based on the magnetic flux density, and the voltage signal is then amplified to provide a measurable signal that can be monitored by a control module (not shown). When the actuator is only moved in a direction along the y-axis, there is no change in flux density detected by Hall effect sensor element 32 because the actuator moves along slot 39 and does not push slide 38.

Alternatively, if actuator 40 is moved in a direction along the x-axis, linear Hall effect sensor assembly 30 will operate in a manner similar to linear Hall effect sensor assembly 20 in detecting position changes along the x-axis. Of course, if actuator 40 is moved along a vector that does not correspond exclusively to either the x or y axis, then linear Hall effect sensor assembly 20 will determine the y component of the vector, and linear Hall effect assembly 30 will determine the x component of the vector.

BEST MODE FOR CARRYING OUT THE INVENTION

Figure 3:
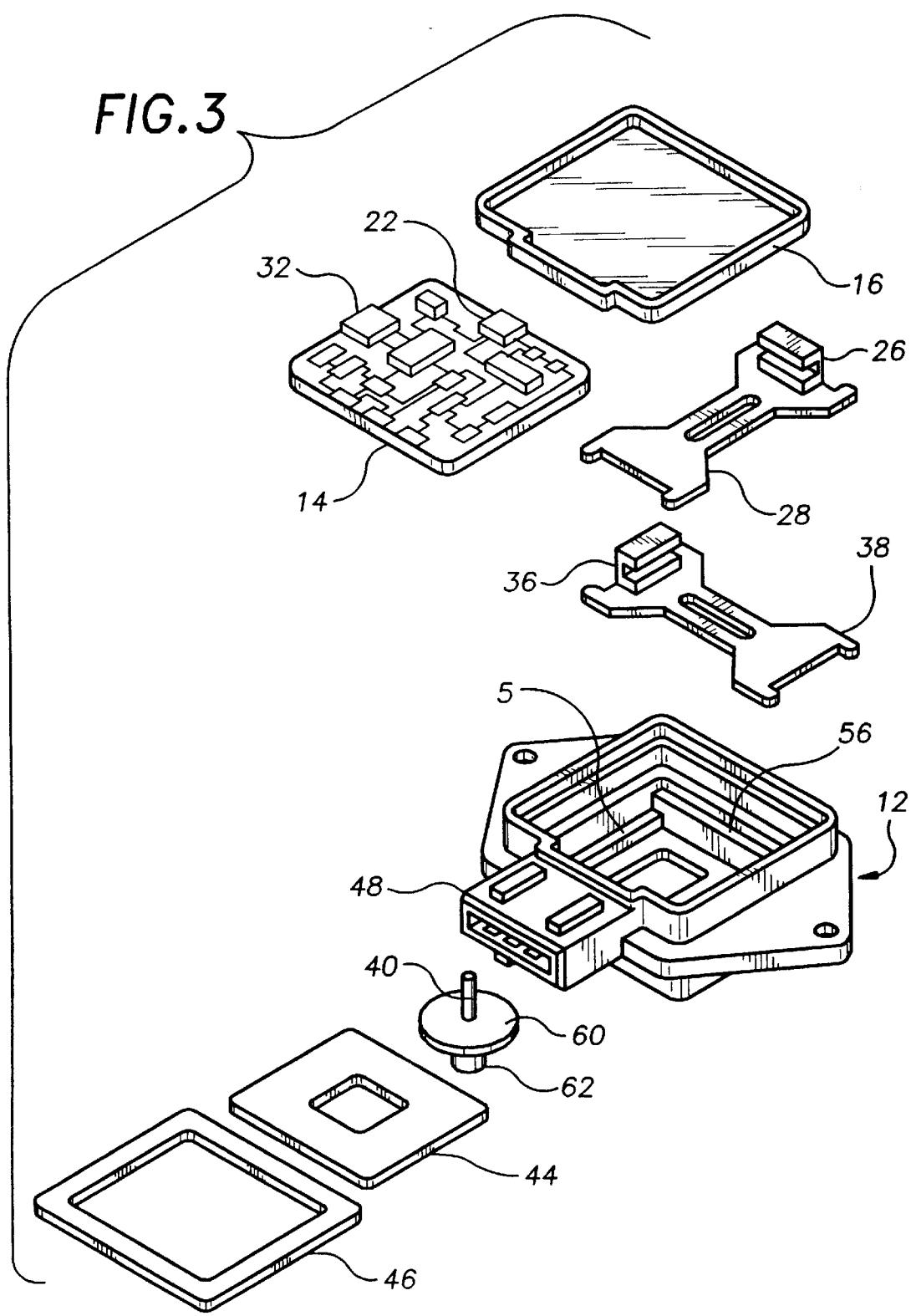
FIG. 3 is an exploded perspective view of a preferred embodiment.

Referring to FIG. 3, there is an exploded perspective view of an exemplary application of the preferred embodiment of the invention for potentially sensing the position of a manual shift transmission (not shown). In addition to the previously discussed elements of the drawing, the dual-axes position sensor 10 includes lip 56 for slide (slide rack) 28 to traverse along. In this embodiment, slide 28 slidably sits on a lip 56 of housing 12 instead of on top of slide 38. A connector 48 is shown for providing electrical connection from dual-axes position sensor 10 to a vehicle control module (not shown). Hall sensor device support 14 includes a substrate with electrical components mounted thereon. Housing 12 also includes a cover 16 and a retainer piece 44 to hold actuator 40 in place using shoulder 60. Retainer piece 44 can be made from any suitable material including metal or plastic. Gasket 46 is used in mounting dual-axes sensor 10 to a manual shift transmission (not shown).

Figure 4:
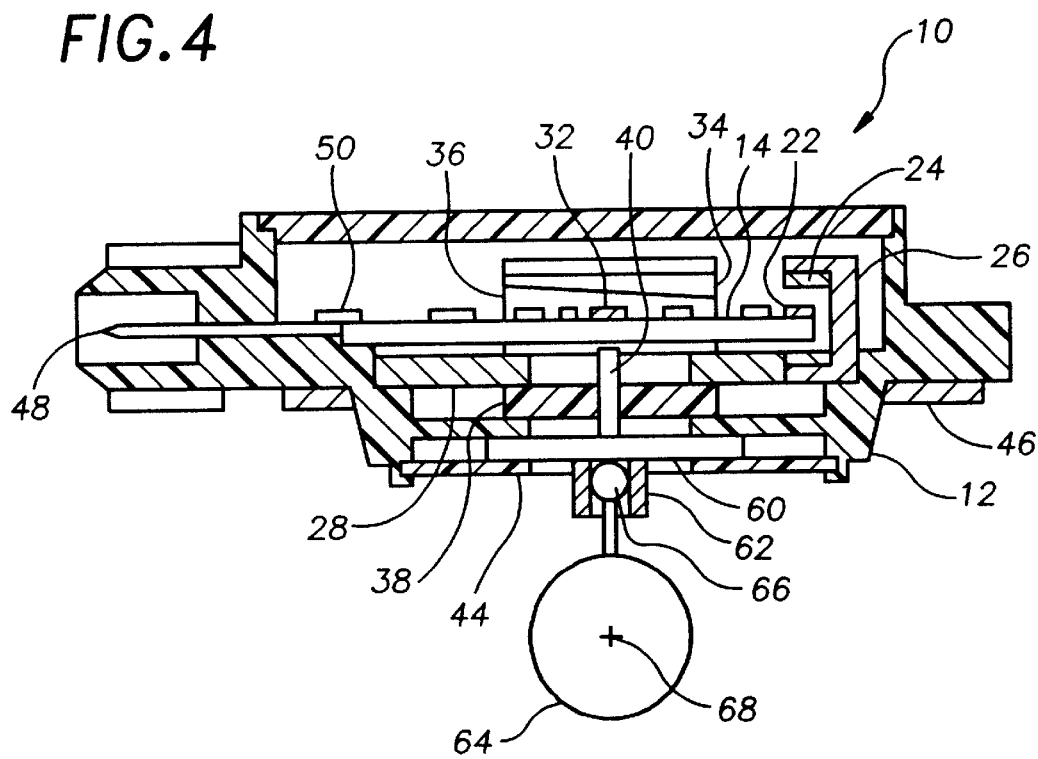
FIG. 4 is a cross sectional view of the preferred embodiment of FIG. 3.

In reference to FIG. 4, there is illustrated a cross sectional view of an exemplary application of the preferred embodiment depicted in FIG. 3. In FIG. 4 the Hall sensor device support 14 is shown wire bonded 50 to connector 48. This view further includes a transmission shift rod 64 that is located in a shift tower mechanism (not shown), and which is coupled to actuator 40 using a ball 66 and socket 62 configuration. Dual-axis position sensor 10 can monitor both the axial and rotational travel of the shift rod using this ball 62 and socket 66 coupling. If transmission shift rod is pushed in the y-axis direction, actuator 40 will also move in the y-axis direction and the movement will be detected by linear Hall effect sensor assembly 20. Furthermore, if transmission shift rod 64 is rotated about its axis 68, actuator 40 will move along the x-axis, and linear Hall effect sensor assembly 30 will detect the movement.

Remarks About the Preferred Embodiment

One of ordinary skill in the art of designing and using hall effect position detecting sensors will realize many advantages from using the preferred embodiment. As illustrated in FIG. 4, it is possible to couple the actuator to a stick shift of a vehicle to sense the position of the stick shift in both the x and y axis. A skilled artisan will also realize that the hall sensors are fixed relative to the motion of the related combination of the two magnets and connecting pole piece. Additionally, it is well understood that the sensors are electrically coupled to appropriate circuitry for analyzing the positional signals generated therefrom.

Variations of the Preferred Embodiment

Although the illustrated embodiments discuss the arrangement of the two sensors relative to each other, one skilled in the art will realize that the preferred embodiment would work with most any arrangement. For example, the two sensors could be positionally switched or placed at different angles to one another. Additionally, although the preferred embodiment discusses the use of two magnets and one pole piece per sensor with the Hall effect sensor positioned therebetween, a skilled artisan could probably use most any known hall effect based sensor design. It is contemplated to design the sensor assembly so that the magnets are stationary and the actuator moves the Hall sensor devices 20 and 30 instead. Additionally, there are many other ways to vary the intensity of the magnetic flux field other than using magnets having different thicknesses. The magnets could be of uniform thickness but positionally slanted to create a variable air gap, or they can be magnetized to varying magnetic flux strengths along their length. The poles in the magnets can also be oriented in a number of different ways so that the Hall sensor device will be able to detect movement.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the description. All changes that come within the meaning and range of equivalency of the claims are to be embraced within their scope.

What is claimed and desired to be secured by Patent is:

1. A sensor for determining the linear position of a movable body along two different axes, comprising:
   a) a housing being fixed in position against relative movement of a the body;
   b) an actuator, positioned in the housing and coupled to the movable body for receiving reciprocating motion;
   c) first linear sensing means, positioned within the housing and coupled to the actuator, for sensing the linear position of the actuator along a first axis wherein the first linear sensing means includes a first sloped magnet means and a first pole piece slidably engaged with the actuator to move with the linear position of the actuator;
   d) second linear sensing means, positioned within the housing and coupled to the actuator, for sensing the linear position of the actuator along a second axis wherein the second linear sensing means includes a second sloped magnet means and a second pole piece slidably engaged with the actuator to move with the linear position of the actuator;
   e) the first linear sensor having a first slide with a first slot thereon for slidably engaging the first linear sensor to the actuator; and
   f) the second linear sensor having a second slide with a second slot thereon for slidably engaging the second linear sensor to the actuator.

2. The sensor of claim 1, wherein the movable body is a shifter that is coupled to the actuator.

3. The sensor of claim 1, wherein the first pole piece forms a U-shape, where the first magnet means includes first and second magnets that are placed upon opposite legs of the first pole piece forming a gap between therebetween.

4. The sensor of claim 3, wherein the first linear sensor includes a first Hall effect sensing element positioned within the gap to sense magnetic flux changes indicative of a relative position of the body.

5. The sensor of claim 1, wherein the second pole piece forms an U-shape where the second magnet means includes third and fourth magnets placed upon opposite legs of the second pole piece forming a void therebetween.

6. The sensor of claim 1, wherein the second linear sensor includes a second Hall effect sensing element positioned within the void to sense magnetic flux changes indicative of a relative position of the body.

7. A sensor for determining a linear position of a movable body along two different axes, comprising:
   a) a housing;
   b) an actuator coupled to the movable body, the actuator including:
      b1) a shaft extending into the housing;
      b2) a first slide located within the housing;
      b3) a second slide located within the housing and positioned adjacent the first slide, the shaft coupled to the first and second slides;
   c) a first magnetic field generator, coupled to the first slide, for generating a first magnetic field as the body moves along a first axis, the first magnetic field generator including a pair of sloped permanent magnets held opposed by a pole piece and mounted to the first slide;
   d) a first magnetic field sensor affixed to the housing and located proximate the first magnetic field generator for sensing the first magnetic field, the first magnetic field sensor generating a first electrical signal corresponding to the position of the movable body along the first axis;
   e) a second magnetic field generator, coupled to the second slide, for generating a second magnetic field as the body moves along a second axis, the second magnetic field generator including a pair of sloped permanent magnets held opposed by a pole piece and mounted to the second slide; and
   f) a second magnetic field sensor affixed to the housing and located proximate the first magnetic field generator for sensing the second magnetic field, the second magnetic field sensor generating a second electrical signal corresponding to the position of the movable body along the second axis.

8. The sensor according to claim 7, wherein the first and second magnetic field sensors each are hall effect devices.

9. The sensor according to claim 8, wherein the first and second slides have a slot through which the shaft extends for slidably engaging the actuator.

10. The sensor according to claim 9, wherein the opposed magnets form an air gap.

11. The sensor according to claim 10, wherein the movable body is a transmission shift rod that is coupled to the actuator using a ball and socket connection.

12. A sensor for determining the position of a movable body along first and second orthogonal axes, comprising:
    a) a housing being fixed in position against relative movement of a the body;
    b) an actuator, positioned in the housing and coupled to the movable body, the actuator having a shaft extending therefrom;
    c) a first slide, positioned adjacent the actuator for movement along the first axis, the first slide having a first slot therein, the shaft extending through the first slot;
    d) a second slide, positioned adjacent the first slide for movement along the second axis, the second slide having a second slot therein, the shaft further extending through the second slot;
    e) a first tapered magnet attached to the first slide for generating a first variable magnetic field;
    f) a second tapered magnet attached to the second slide for generating a second variable magnetic field;
    g) a first magnetic field sensor affixed to the housing and located proximate the first magnet for sensing a first magnetic flux, the first magnetic field sensor generating a first electrical signal corresponding to the position of the movable body along the first axis; and
    h) a second magnetic field sensor affixed to the housing and located proximate the second magnet for sensing a second magnetic flux, the second magnetic field sensor generating a second electrical signal corresponding to the position of the movable body along the second axis.

13. The sensor according to claim 12, wherein the first and second magnets each are a pair of sloped permanent magnets held opposed by a pole piece.

14. The sensor according to claim 13, wherein the first and second magnetic field sensors each are hall effect devices.

15. The sensor according to claim 13, wherein the opposed magnets form an air gap.

16. The sensor according to claim 13, wherein the movable body is a transmission shift rod that is coupled to the actuator using a ball and socket connection.

* * * * *